(12) United States Patent
Sakurai et al.

(10) Patent No.: US 12,112,226 B2
(45) Date of Patent: Oct. 8, 2024

(54) WIRELESS TAG READING APPARATUS, STORAGE MEDIUM, AND METHOD

(71) Applicant: Toshiba Tec Kabushiki Kaisha, Tokyo (JP)

(72) Inventors: Wataru Sakurai, Izu Shizuoka (JP); Nobuo Murofushi, Susono Shizuoka (JP); Shigeaki Suzuki, Gotemba Shizuoka (JP); Yuki Suzuki, Izunokuni Shizuoka (JP); Masaki Kimura, Izunokuni Shizuoka (JP); Yuichiro Kawabe, Mishima Shizuoka (JP); Haruka Otake, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/362,930

(22) Filed: Jul. 31, 2023

(65) Prior Publication Data
US 2024/0095476 A1    Mar. 21, 2024

(30) Foreign Application Priority Data
Sep. 20, 2022    (JP) .................................. 2022-149403

(51) Int. Cl.
*G06K 7/10* (2006.01)
(52) U.S. Cl.
CPC ................ *G06K 7/10366* (2013.01)
(58) Field of Classification Search
CPC ................................................. G06K 7/10366
USPC ......................................................... 235/451
See application file for complete search history.

(56) References Cited

U.S. PATENT DOCUMENTS

| | | | |
|---|---|---|---|
| 2019/0180063 A1 | 6/2019 | Suzuki | |
| 2019/0392183 A1* | 12/2019 | Oishi | G06K 7/10376 |
| 2021/0081620 A1* | 3/2021 | Yaginuma | G06K 7/10099 |
| 2021/0405934 A1 | 12/2021 | Kumabayashi | |
| 2023/0177290 A1* | 6/2023 | Ishikawa | G06K 7/10366 235/451 |
| 2023/0307827 A1* | 9/2023 | Nakamura | G06K 7/10366 |
| 2024/0036152 A1* | 2/2024 | Tomiyama | G01S 5/0269 |
| 2024/0040051 A1* | 2/2024 | Kurita | H04N 1/00551 |
| 2024/0095473 A1* | 3/2024 | Sakurai | G01S 5/02 |

FOREIGN PATENT DOCUMENTS

JP    2019-106074 A    6/2019

* cited by examiner

*Primary Examiner* — Allyson N Trail
(74) *Attorney, Agent, or Firm* — Kim & Stewart LLP

(57) ABSTRACT

A wireless tag reading apparatus includes an antenna, a driving mechanism configured to move the antenna to multiple positions, and a controller configured to: upon receipt of a radio wave from a wireless tag via the antenna at each of the multiple positions, obtain tag information stored in the wireless tag and radio wave information related to the radio wave, adjust the radio wave information based on the tag information, and determine whether the wireless tag is a reading target based on information indicating a position of the wireless tag that is output from a model in response to an input of the adjusted radio wave information.

20 Claims, 14 Drawing Sheets

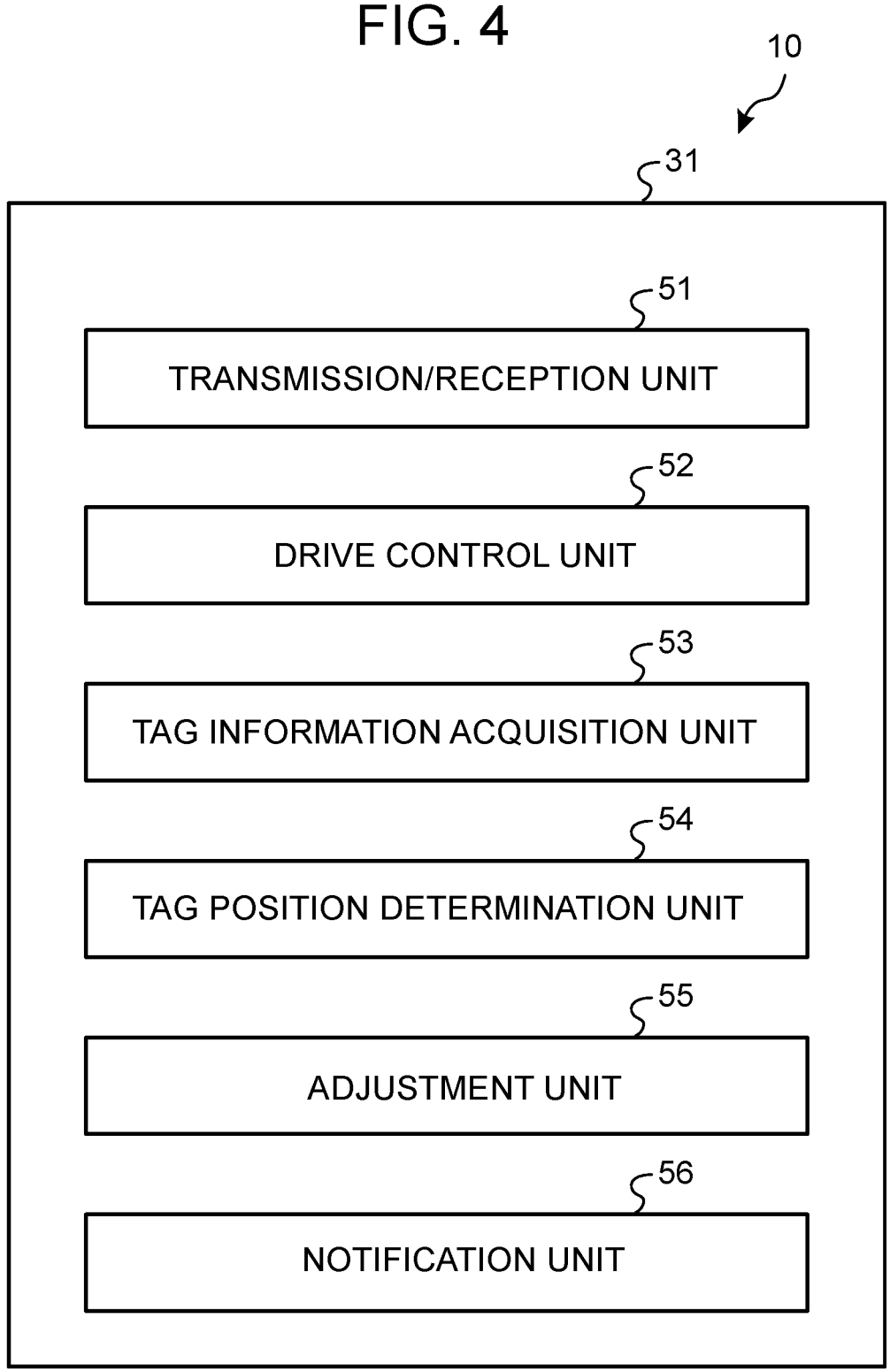

WIRELESS TAG READING APPARATUS, STORAGE MEDIUM, AND METHOD

CROSS-REFERENCE TO RELATED APPLICATION(S)

This application is based upon and claims the benefit of priority from Japanese Patent Application No. 2022-149403, filed Sep. 20, 2022, the entire contents of which are incorporated herein by reference.

FIELD

Embodiments described herein relate generally to a wireless tag reading apparatus, a storage medium, and a method.

BACKGROUND

There is a known technology for reading tag information from a wireless tag, such as a Radio Frequency Identification (RFID) tag, attached to an object. The tag information includes information on the object. For example, there is a technology for measuring a Received Signal Strength Indicator (RSSI) and a phase of a radio wave transmitted from a wireless tag while changing the relative position between an antenna and the wireless tag, and determining whether the wireless tag transmitting the radio wave is located in a predetermined area based on the measured RSSI and phase values.

However, there are many types of wireless tags, and the RSSI and phase values of a radio wave from a wireless tag vary depending not only on the distance between the wireless tag and the antenna but also on the ambient environment, such as the presence of a reflector or a scatterer of radio waves. For this reason, depending on the radio wave environment, it is difficult to correctly determine whether a wireless tag is located in a predetermined area.

SUMMARY OF THE INVENTION

According to an aspect of this disclosure, a wireless tag reading apparatus comprises an antenna, a driving mechanism configured to move the antenna to multiple positions, and a controller configured to: upon receipt of a radio wave from a wireless tag via the antenna at each of the multiple positions, obtain tag information stored in the wireless tag and radio wave information related to the radio wave, adjust the radio wave information based on the tag information, and determine whether the wireless tag is a reading target based on information indicating a position of the wireless tag that is output from a model in response to an input of the adjusted radio wave information.

BRIEF DESCRIPTION OF THE DRAWINGS

FIG. 4 is a block diagram of a functional configuration of the wireless tag reading apparatus.

DETAILED DESCRIPTION

Hereinafter, a wireless tag reading apparatus, a storage medium, and a method according to embodiments will be described with reference to the drawings.

Embodiments described below are related to reading tag information from a wireless tag attached to an object. Note that, in the embodiments below, an item sold at, for example, a store is used as an example of an object to which a wireless tag is attached. However, the present invention is not limited to this example. Examples of objects to which wireless tags are attached may include various kinds of objects to be managed in, for example, sales, distribution, and storage stages.

(Schematic Configuration of Wireless Tag Reading Apparatus)

Figure 1:
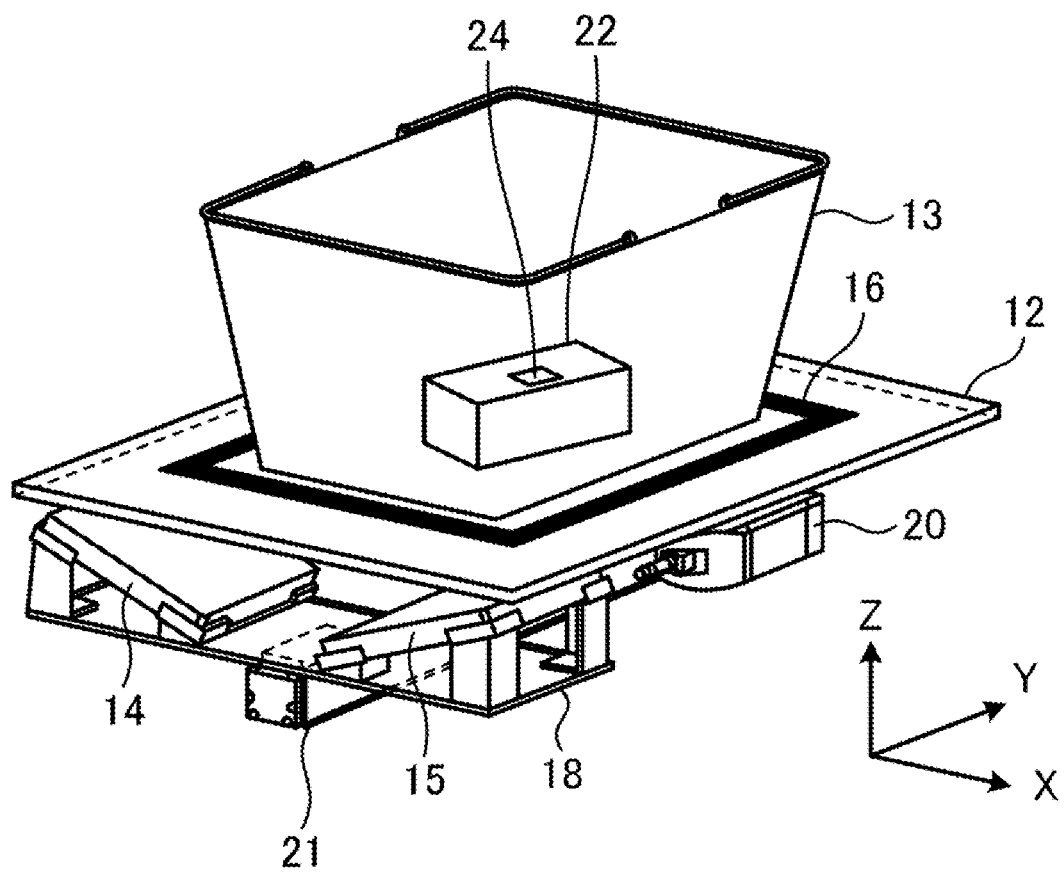
FIG. 1 is an external perspective view illustrating a configuration of a wireless tag reading apparatus according to an embodiment.
Figure 2:
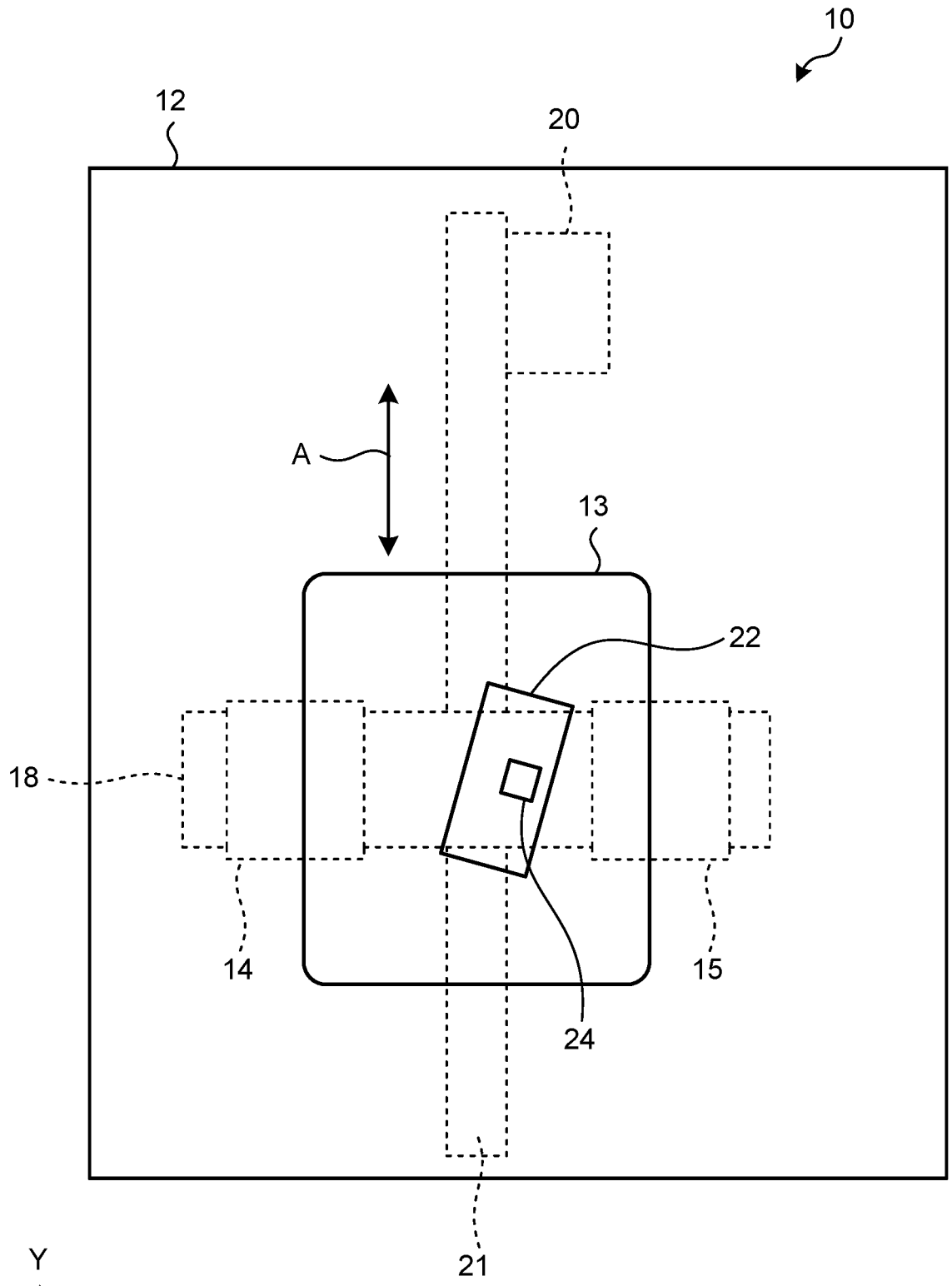
FIG. 2 is a top view of a part around an antenna of the wireless tag reading apparatus.

A schematic configuration of a wireless tag reading apparatus 10 will be described with reference to FIGS. 1 and 2. FIG. 1 is an external perspective view illustrating a configuration of the wireless tag reading apparatus 10 according to an embodiment. FIG. 2 is a top view of a part around an antenna of the wireless tag reading apparatus 10.

The wireless tag reading apparatus 10 is installed in, for example, a self-service checkout machine. As shown in FIG. 1, the wireless tag reading apparatus 10 moves a pair of antennas 14 and 15, which are mounted on a moving stage 18, along a Y-axis below a table 12. The pair of antennas 14 and 15 are arranged below the table 12 along the X-axis. The pair of antennas 14 and 15 are tilted about the Y-axis toward a position where a basket 13 is placed. The basket 13 is placed in a predetermined position on the table 12, for example, inside a position marker 16 provided on the table 12. At least one item 22 is placed in the basket 13. Note that the item 22 may be directly placed inside the position marker 16 on the table 12. That is, the basket 13 may be omitted.

As shown in FIG. 2, the moving stage 18 is moved along a rail 21 in the Y-axis direction, that is, in the direction of an arrow A, by a rotational driving force of a driving motor 20. Here, the combination of the moving stage 18, the driving motor 20, and the rail 21 is an example of a driving mechanism.

The antenna 14 and the antenna 15 transmit radio waves (transmission waves) for reading information (tag information) registered in a Radio Frequency Identification (RFID) tag 24 attached to the item 22 in a time division manner while moving in the Y-axis direction. The antenna 14 and the antenna 15 receive radio waves (response waves) from the RFID tag 24. The wireless tag reading apparatus 10 repeatedly transmits and receives such radio waves at predetermined time intervals.

Since the RFID tag 24 has directivity, the wireless tag reading apparatus 10 includes two antennas 14 and 15 and transmits transmission waves from different directions so that it is possible to reliably detect a response wave from the RFID tag 24 regardless of the orientation of the RFID tag 24 inside the basket 13. The number of antennas is not limited to two.

The RFID tag 24 is also referred to as an IC tag or the like, and has a configuration in which an IC chip and a tag antenna (inlay) are embedded in a thin film. The RFID tag 24 receives, with the tag antenna, a radio wave (transmission wave) transmitted from each of the antennas 14 and 15. When a radio wave is received by the RFID tag 24, electric power is generated. When receiving, from one of the antennas 14 and 15, a radio wave for reading information (e.g., tag information in the present embodiment) stored in a storage medium such as a flash memory in the IC chip, the RFID tag 24 transmits the tag information as a response wave (i.e., a radio wave) in response to the transmission wave by using the generated electric power. The tag information stored in the RFID tag 24 is, for example, an item code (for example, an Electronic Product Code (EPC)) for identifying the item 22 to which the RFID tag 24 is attached. The RFID tag 24 has, for example, an adhesive surface and is attached to the item 22 by adhesion. The RFID tag 24 may be attached to the item 22 with a band or the like. In addition, the RFID tag 24 may be formed as a part of the package of the item 22, e.g., embedded in the package of the item 22, and thereby attached to the item 22. Here, the RFID tag 24 is an example of a wireless tag.

In order to prevent the radio wave environment from being disturbed by external foreign matter, the wireless tag reading apparatus 10 may include a shield that blocks radio waves and is disposed on the table 12 to surround a region corresponding to the position marker 16, for example, the basket 13 placed on the table 12.

(Hardware Configuration of Wireless Tag Reading Apparatus)

Figure 3:
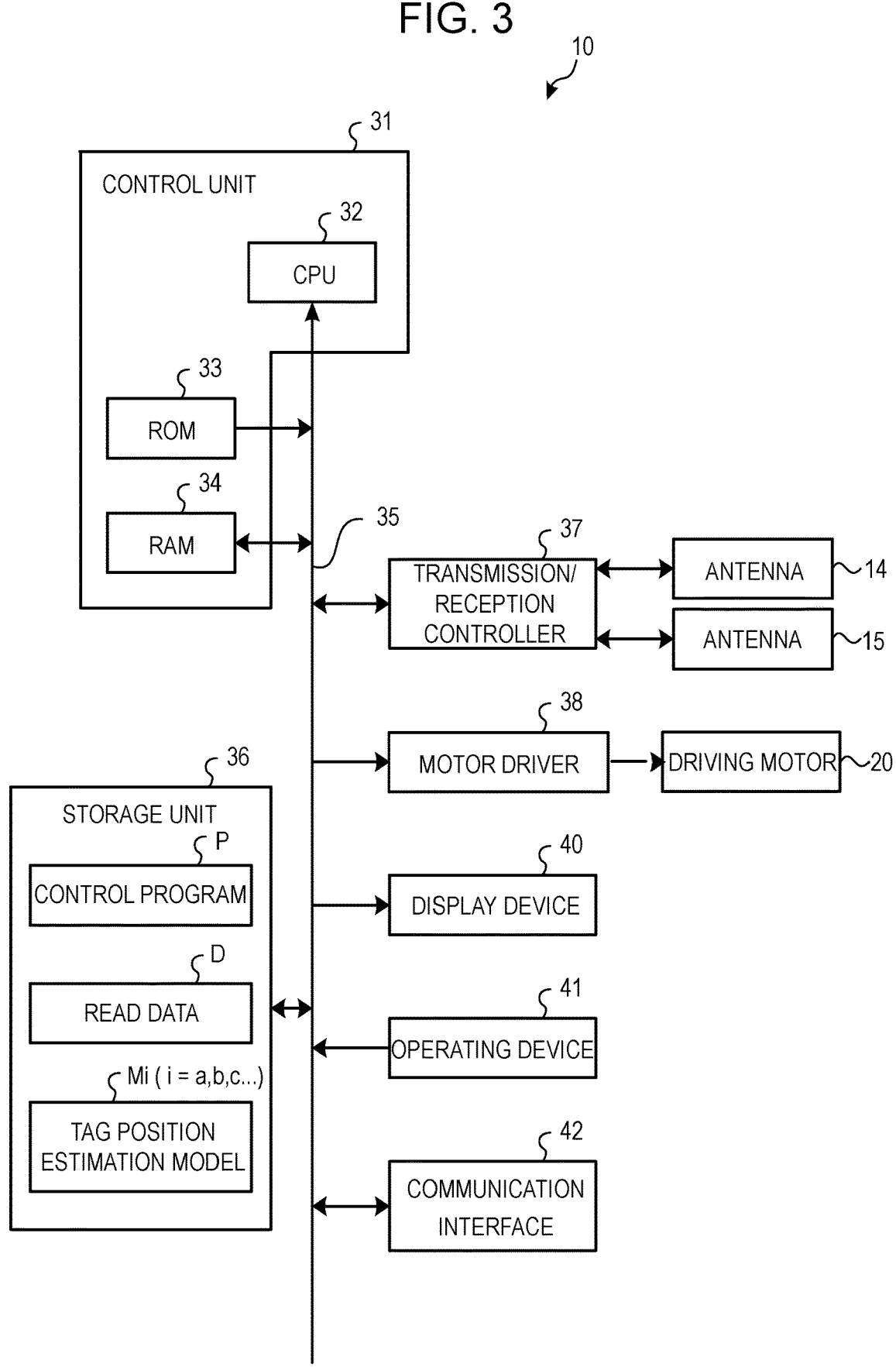
FIG. 3 is a block diagram of a hardware configuration of the wireless tag reading apparatus.

A hardware configuration of the wireless tag reading apparatus 10 will be described with reference to FIG. 3. FIG. 3 is a block diagram illustrating an example of a hardware configuration of the wireless tag reading apparatus 10.

As illustrated in FIG. 3, the wireless tag reading apparatus 10 includes the antennas 14 and 15, a driving motor 20, a control unit 31, a storage unit 36, a transmission/reception controller 37, a motor driver 38, a display device 40, an operating device 41, and a communication interface 42. The control unit 31, the storage unit 36, the transmission/reception controller 37, the motor driver 38, the display device 40, the operating device 41, and the communication interface 42 are connected to each other for communication via an internal bus 35, such as an address bus or a data bus. Further, the antennas 14 and 15 are connected to the transmission/reception controller 37 for communication. Further, the driving motor 20 is connected to the motor driver 38 for communication.

The control unit 31 includes a Central Processing Unit (CPU) 32, a Read-Only Memory (ROM) 33, and a Random Access Memory (RAM) 34. The control unit 31 is an example of a controller. The CPU 32, the ROM 33, and the RAM 34 are connected to each other via the internal bus 35 for communication. The control unit 31 has a configuration similar to that of a typical computer and is configured to load various programs stored in the ROM 33 and the storage unit 36 into the RAM 34 and to control the operations of components of the wireless tag reading apparatus 10 by executing the loaded programs with the CPU 32. The control unit 31 functions as a reading apparatus that reads data stored in the RFID tag 24 by cooperating with the transmission/reception controller 37 and the antennas 14 and 15. In addition, the control unit 31 may function as a writer that writes data to the RFID tag 24. The respective functions implemented by the control unit 31 will be described later (see FIG. 4).

The storage unit 36 is a storage device including a nonvolatile storage medium such as a Hard Disk Drive (HDD) or a Solid State Drive (SSD). The storage unit 36 stores various programs and various types of data related to the operation of the wireless tag reading apparatus 10. For example, the storage unit 36 stores a control program P, read data D, and tag position estimation models Mi (i=a, b, c, . . . ). The control program P is a program for driving the wireless tag reading apparatus 10. The read data D is data acquired from the RFID tag 24 while moving the antennas 14 and 15. The read data D will be described later (see FIG. 6). The tag position estimation models Mi (i=a, b, c, . . . ) are used to estimate the position of the RFID tag 24 that has transmitted a received response wave. The tag position estimation models Mi will be described later (see FIG. 8).

The transmission/reception controller 37 is configured to transmit and receive radio waves via the antennas 14 and 15 under the control of the control unit 31.

The motor driver 38 is configured to move the moving stage 18 by driving the driving motor 20 under the control of the control unit 31.

The display device 40 is configured to display a generated screen under the control of the control unit 31. For example, the display device 40 may be implemented by a Liquid Crystal Display (LCD) or an organic electroluminescence (EL) display.

The operating device 41 is configured to receive an input operation from an operator and transmit the input operation to the control unit 31. For example, the operating device 41 may be implemented by an input device such as a touch panel or a keyboard.

The communication interface 42 is an interface for communicating with external devices such as a POS terminal and a store server (not shown) via a telecommunication line such as the Internet or an intranet. The wireless tag reading apparatus 10 outputs information read from the RFID tag 24 to these external devices.

(Functional Configuration of Wireless Tag Reading Apparatus)

A functional configuration of the wireless tag reading apparatus 10 will be described with reference to FIG. 4. FIG. 4 is a block diagram illustrating an example of a functional configuration of the wireless tag reading apparatus 10.

The control unit 31 of the wireless tag reading apparatus 10 executes the control program P loaded into the RAM 34 to implement functions such as a transmission/reception unit 51, a drive control unit 52, a tag information acquisition unit 53, a tag position determination unit 54, an adjustment unit 55, and a notification unit 56, as shown in FIG. 4.

The transmission/reception unit 51 transmits a radio wave and receives a response wave from the RFID tag 24 attached to the item 22 in response to the radio wave (transmission wave).

The drive control unit 52 moves the positions of the antennas 14 and 15 with time. Here, the control unit 31 implementing the drive control unit 52 is an example of a drive unit.

Based on a response wave received by the antenna 14 or 15 from at least one RFID tag 24, the tag information acquisition unit 53 acquires identification information, a Received Signal Strength Indicator (RSSI) value of the response wave as a time-series signal, and a phase value of the response wave. Here, the RSSI value represents the strength of the response wave returned from the RFID tag 24. The phase value represents a phase difference between the transmission wave and the response wave returned from the RFID tag 24. Based on the phase value, the distance between the antennas 14 or 15 and the RFID tag 24 can be estimated. The RSSI and phase values will be described later (see FIG. 5B). The identification information includes tag attribute information related to attributes of the RFID tag 24 and item attribute information related to attributes of the item 22 registered in the RFID tag 24. The tag attribute information is information indicating various attributes related to the configuration of the RFID tag 24. The item attribute information (or object attribute information) indicates various attributes of the item 22 (or an object) to which the RFID tag 24 is attached. The tag attribute information and the item attribute information will be described later (see FIG. 6). As an example, the tag information acquisition unit 53 causes the storage unit 36 to store information for identifying the antenna 14 or 15, a time at which the response wave is received, the RSSI value, the phase value, and the tag attribute information and the item attribute information read from the RFID tag 24 in association with each other as the read data D.

The tag position determination unit 54 performs a determination process of determining the position of the RFID tag 24 based on the RSSI value and the phase value. Determination of the position of the RFID tag 24 will be described later (see FIG. 7). For example, when the reliability level of the position of RFID tag 24 is less than a predetermined threshold value, the tag position determination unit 54 determines whether the item 22 to which the RFID tag 24 is attached is a reading target to be read based on an output of the operating device 41 corresponding to an operation performed by the user. As an example, when it is determined that RFID tag 24 is located inside the position marker 16 or when the user confirms that the item 22 to which RFID tag 24 is attached is a reading target, the tag position determination unit 54 outputs a reading result of the RFID tag 24 to an external device.

The adjustment unit 55 adjusts the determination process performed by the tag position determination unit 54 based on the identification information. For example, the adjustment unit 55 performs preprocessing for offsetting the RSSI value used by the tag position determination unit 54 in the determination process in accordance with the identification information. For example, the adjustment unit 55 selects a tag position estimation model Mi used by the tag position determination unit 54 in the determination process according to the identification information.

When the reliability of the position of the RFID tag 24 is less than the predetermined threshold value, the notification unit 57 notifies the user that the reading result may be incorrect by using, for example, the display device 40.

(RSSI Value and Phase Value)

Figure 5A:
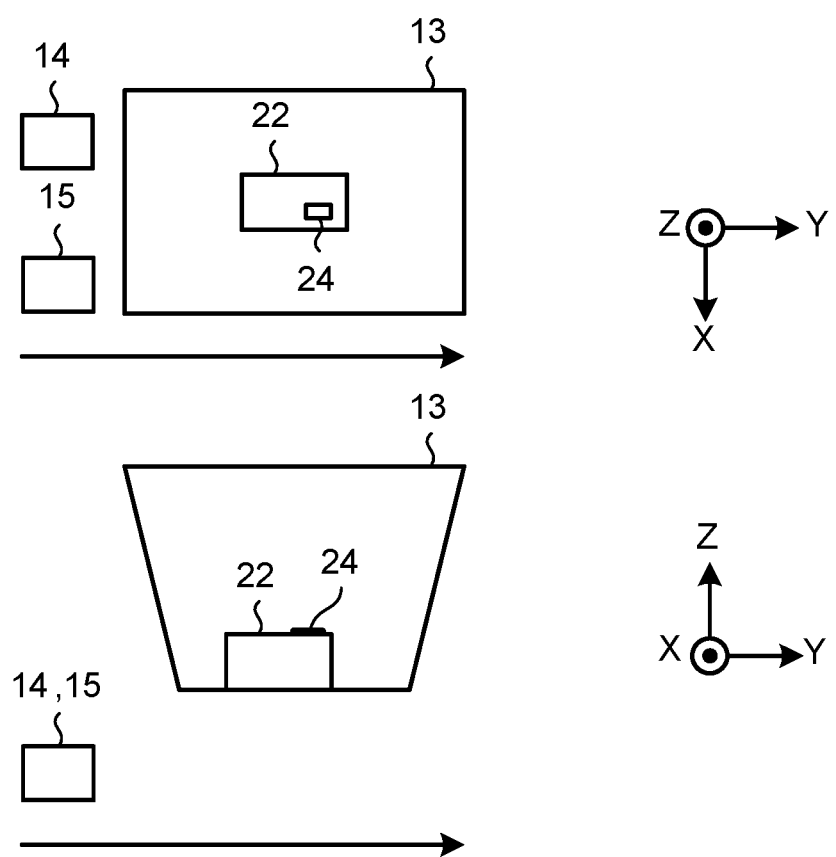
FIGS. 5A and 5B are diagrams for explaining a process of reading tag information from an RFID tag according to an embodiment.
Figure 5B:
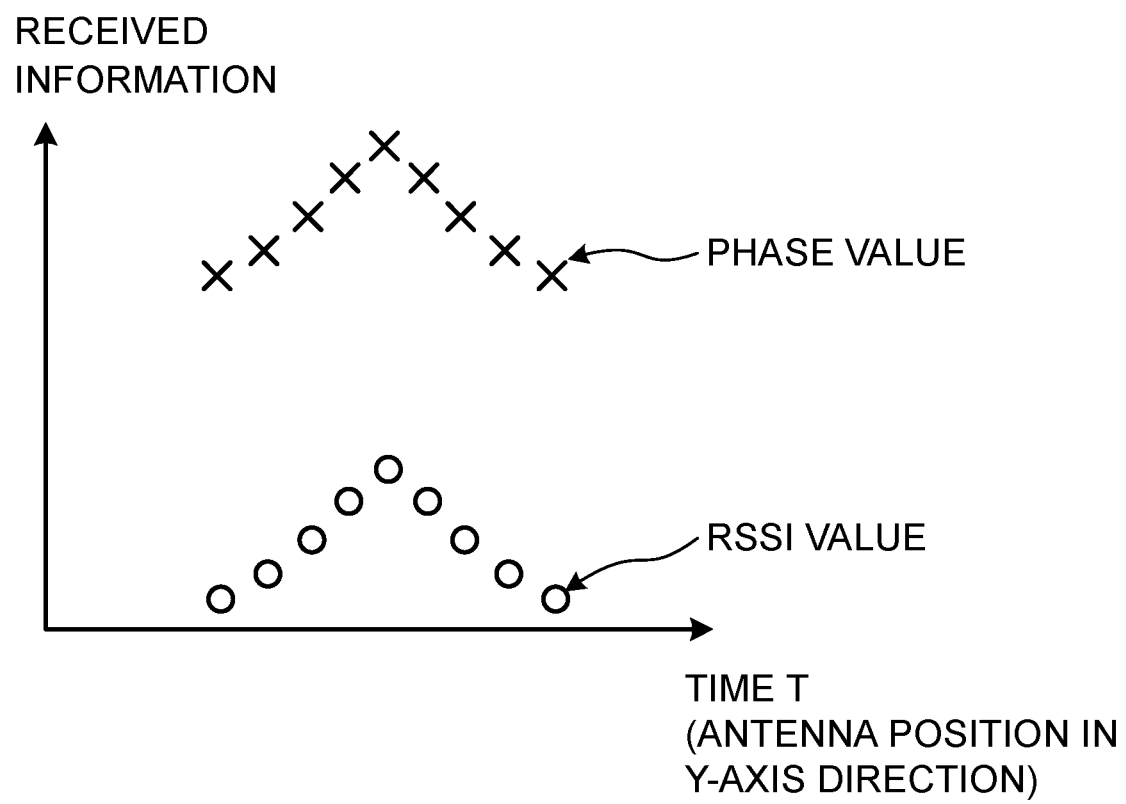

An RSSI value De and a phase value Df acquired by the wireless tag reading apparatus 10 will be described with reference to FIGS. 5A and 5B. FIGS. 5A and 5B are diagrams for explaining a process of reading tag information from the RFID tag 24 according to an embodiment. FIG. 5A illustrates a top view and a side view of a state in which the wireless tag reading apparatus 10 is reading information from the RFID tag 24 attached to the item 22 in the basket 13. FIG. 5B illustrates a relationship between the RSSI value and the phase value.

As shown in FIG. 5A, the wireless tag reading apparatus 10 transmits radio waves from the antennas 14 and 15 toward the basket 13 in a time-division manner while moving the antennas 14 and 15 along the Y-axis under the basket 13 placed in a fixed position. The antennas 14 and 15 receive response waves from the RFID tag 24 attached to the item 22 in response to the radio waves transmitted by the antennas 14 and 15.

Since the transmission of the radio waves and the reception of the response waves are performed at predetermined time intervals while the antennas 14 and 15 are being moved, the wireless tag reading apparatus 10 acquires time-series data of the RSSI and phase values as shown in FIG. 5B.

The horizontal axis in FIG. 5B represents time t at which the wireless tag reading apparatus 10 acquires the response waves. Also, the horizontal axis in FIG. 5B may be regarded as indicating the Y-axis position of the antennas 14 and 15.

In the time series data of the RSSI value, the RSSI value increases as the antenna 14 or 15 moves closer to the RFID tag 24 returning the response wave. Also, in the time series data of the RSSI value, the RSSI value decreases as the antenna 14 or 15 moves away from the RFID tag 24 returning the response wave. Therefore, as shown in FIG. 5B, the RSSI value increases as the antenna 14 or 15 moves closer to the basket 13.

In the time series data of the phase value, the phase value varies depending on the distance between the antenna 14 or 15 and the RFID tag 24 returning the response wave. In FIG. 5B, the phase value increases as the distance between the antenna 14 or 15 and the RFID tag 24 returning the response wave decreases. Note that the phase values shown in FIG. 5B are obtained by correcting discontinuously changing phase values so that the phase values change continuously.

(Description of Information Acquired by Wireless Tag Reading Apparatus)

Figure 6:
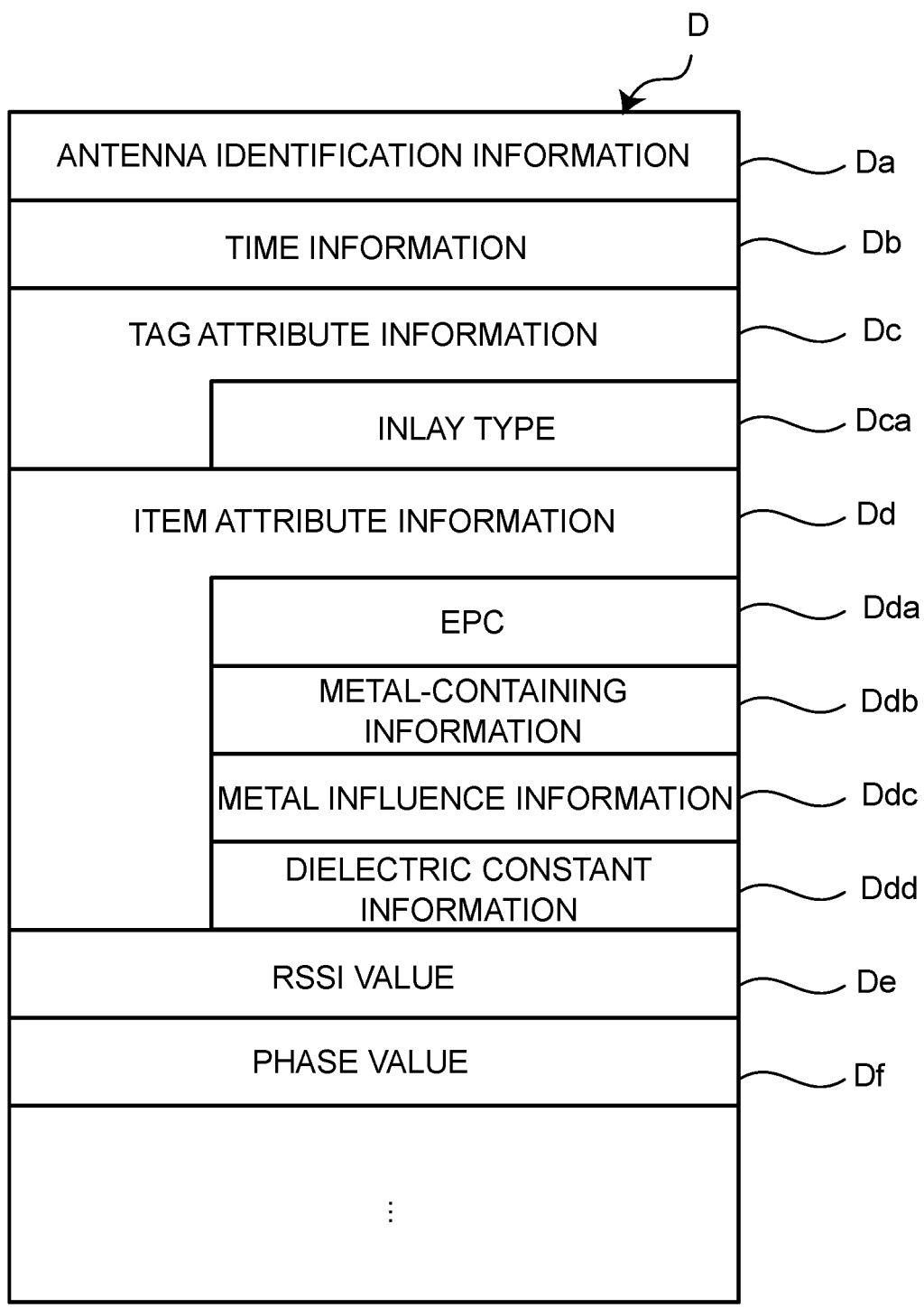
FIG. 6 is a diagram illustrating read data obtained from an RFID tag according to an embodiment.

The content of the read data D acquired from the RFID tag 24 by the wireless tag reading apparatus 10 will be described with reference to FIG. 6. FIG. 6 is a diagram illustrating an example of the read data D acquired from the RFID tag 24 according to an embodiment.

As illustrated in FIG. 6, the read data D includes antenna identification information Da, time information Db, tag attribute information Dc, item attribute information Dd, an RSSI value De, and a phase value Df in association with each other.

The antenna identification information Da indicates an antenna that has received a response wave. In the example of FIG. 1, the antenna identification information Da indicates either the antenna 14 or the antenna 15.

The time information Db indicates a time at which the response wave from the RFID tag 24 is received. The time information Db is measured by the control unit 31. Instead of the time information Db, position information indicating the position of the antenna 14 or 15 at the time of receiving the response-wave from the RFID tag 24 may be stored. The position of each of the antennas 14 and 15 may be determined by, for example, detecting the movement of the moving stage 18 from a predetermined home position in a direction defined by the rotation direction of the driving motor 20 based on the number of revolutions of the driving motor 20 output from, for example, an encoder.

The tag attribute information Dc indicates an attribute related to the configuration of the RFID tag 24. The tag attribute information Dc includes, for example, an inlay type Dca. The RFID tag 24 is formed of an IC tag chip and an RFID tag antenna (inlay), and there are various types of RFID tag antenna (inlay). For example, there are inlays that may affect the reading performance. Thus, the inlay type Dca indicates a type of inlay that may affect the reading performance.

Note that the tag attribute information Dc is not limited to information indicating the inlay type Dca (tag type), but may be information indicating a tag group (tag type) formed by at least one inlay type.

The item attribute information Dd includes various attributes of the item 22 to which the RFID tag 24 is attached.

The item attribute information Dd includes, for example, an Electronic Product Code (EPC) Dda, metal-containing information Ddb, metal influence information Ddc, and dielectric constant information Ddd.

The EPC Dda is an item code for identifying the item 22. The EPC Dda is, for example, a Japanese Article Number (JAN) code.

The metal-containing information Ddb indicates whether the item 22 contains a metal. When the item 22 contains a metal, the impedance matching between the RFID tag chip and the IC tag antenna of the RFID tag 24 is lost. As a result, the IC tag antenna becomes non-functional, and the reading performance of the RFID tag 24 is degraded. An example of the item 22 containing a metal is an item including lamé. Thus, the metal-containing information Ddb indicates that an item includes a metal.

The metal influence information Ddc indicates that an item contains a metal and particularly influences the reading performance. For example, in the case of an item including lamé, the influence of metal or lamé varies depending on the thickness and quantity of lamé thread and the method of sewing the lamé thread. In addition, even in the case of an item including lamé, when the surface of the item has irregularities, the distance between the RFID tag 24 and the item including lamé may increase, and the influence of lamé on the reading performance may be reduced. Thus, the metal influence information Ddc indicates an item that contains a metal and particularly influences the reading performance.

The dielectric constant information Ddd indicates whether the item 22 has a high dielectric constant. When the item 22 has a high dielectric constant, the performance of the RFID tag antenna may be degraded. An item including denim is an example of the item 22 having a high dielectric constant. Thus, the dielectric constant information Ddd indicates that the dielectric constant of an item may affect the reading performance.

Although not illustrated in FIG. 4, an item containing a large amount of water, such as a cosmetic item, may also influence the reading performance and therefore may be managed by assigning item attribute information Dd to the item.

The RSSI value De indicates the strength of the response wave returned from the RFID tag 24.

The phase value Df indicates a phase difference between the transmission wave and the response wave returned from the RFID tag 24. The phase value Df varies between 0° and 359°. When the phase difference between the transmission wave and the response wave changes from 359° to 360°, the phase value indicates 0° again. Therefore, the phase value acquired by the wireless tag reading apparatus 10 is discontinuous between 359° and 0°. For this reason, the wireless tag reading apparatus 10 performs a process of correcting an acquired phase value. Specifically, when the phase value changes from 359° to 0°, the phase value after the change is corrected to 360°. When the phase value changes from 0° to 359°, the phase value after the change is corrected to −1°. Accordingly, the phase value Df acquired by the wireless tag reading apparatus 10 continuously changes with time.

The read data D has a predetermined bit length. Each of the information items described above is placed in a predetermined bit position in the read data D. Since the wireless tag reading apparatus 10 reads multiple sets of data from multiple RFID tags 24 while moving the antennas 14 and 15 to various positions, the wireless tag reading apparatus 10 acquires multiple sets of read data D in time series.

(Determination of Position of RFID Tag)

Figure 7:
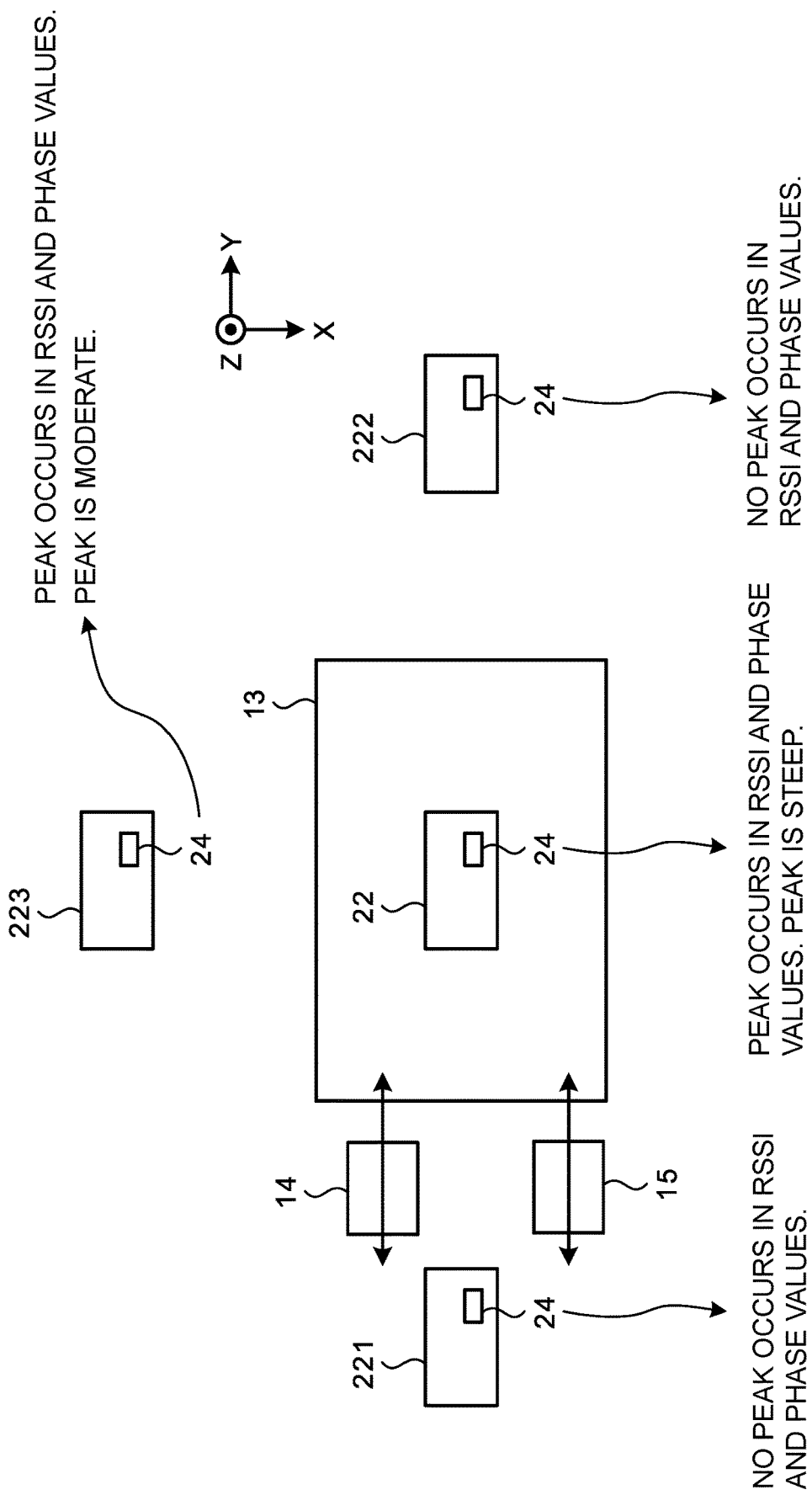
FIG. 7 is a diagram for describing a method of determining the position of an RFID tag according to an embodiment.

With reference to FIG. 7, a method of determining the position of the RFID tag 24 by the wireless tag reading apparatus 10 will be described. FIG. 7 is a diagram for explaining a method of determining the position of the RFID tag 24 according to an embodiment.

A time-series change pattern of each of the RSSI value and the phase value acquired by the wireless tag reading apparatus 10 (refer to FIG. 5B) corresponds one-to-one to the position of the RFID tag 24. FIG. 7 shows an outline of time-series change patterns of the RSSI and phase values acquired by the wireless tag reading apparatus 10 when the same RFID tag 24 is placed in multiple positions inside and outside the basket 13.

When the item 22 to which the RFID tag 24 is attached is inside of the basket 13, the time-series change pattern of each of the RSSI value and the phase value acquired by the wireless tag reading apparatus 10 shows a steep peak as shown in FIG. 5B.

Assume that an item 221 with the RFID tag 24 is located outside of the basket 13 in a position that is the same as the item 22 in the X-axis direction and is offset in the negative Y-axis direction from the item 22. In this case, the time-series change patterns of the RSSI value and the phase value acquired by the wireless tag reading apparatus 10 show that both of the RSSI value and the phase value monotonically decrease as the antennas 14 and 15 move in the positive Y-axis direction. Also, in this case, no peak occurs in the RSSI value and the phase value.

Assume that an item 222 with the RFID tag 24 is located outside of the basket 13 in a position that is the same as the item 22 in the X-axis direction and is offset in the positive Y-axis direction. In this case, the time-series change patterns of the RSSI value and the phase value acquired by the wireless tag reading apparatus 10 show that both of the RSSI value and the phase value monotonically increase as the antennas 14 and 15 move in the positive Y-axis direction. Also, in this case, no peak occurs in the RSSI value and the phase value.

Assume that an item 223 with the RFID tag 24 is located outside of the basket 13 in a position that is the same as the item 22 in the Y-axis direction and is offset in the negative X-axis direction. In this case, both of the time-series change patterns of the RSSI value and the phase value acquired by the wireless tag reading apparatus 10 show peaks, but the peaks are moderate compared with the case where the RFID tag 24 is inside of the basket 13.

(Tag Position Estimation Models)

Figure 8:
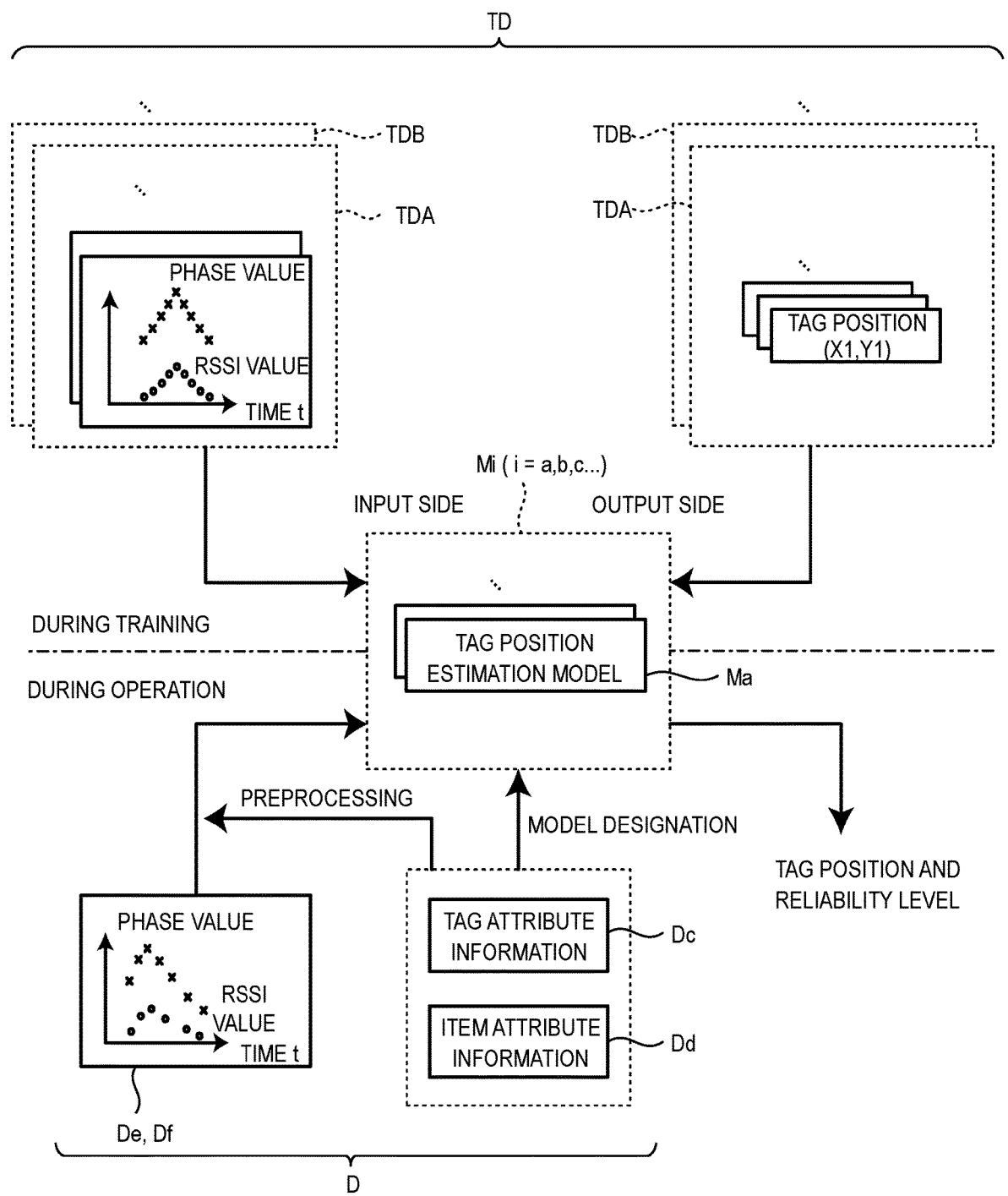
FIG. 8 is a diagram for explaining tag position estimation models according to an embodiment.

The tag position estimation models Mi (i=a, b, c, . . . ) will be described with reference to FIG. 8. FIG. 8 is a diagram for explaining the tag position estimation models Mi according to an embodiment.

As described above, the time-series change patterns of the RSSI and phase values acquired by the wireless tag reading apparatus 10 are correlated with the positions of the RFID tag 24. Accordingly, in each of the tag position estimation models Mi according to the present embodiment, parameters are determined such that information related to the position of the RFID tag 24 is output in response to an input of time-series change patterns (radio wave information) of the RSSI value and the phase value. Each of the tag position estimation models Mi is, for example, a machine learning model, but may also be implemented by a look-up table that associates RSSI and phase values (parameters) with the positions of the RFID tag 24 (parameters).

The parameters of the tag position estimation models Mi may be determined by the wireless tag reading apparatus 10 by using training data TD or may be obtained from the outside. Also, parameters obtained from the outside may be updated in the wireless tag reading apparatus 10.

(Training of Tag Position Estimation Models)

As an example, training data TD for the output side of the tag position estimation models Mi includes multiple predetermined positions (x, y). As an example, training data TD for the input side of the tag position estimation models Mi includes time-series change patterns of the RSSI value and the phase value. The training data TD is collected by placing the RFID tag 24 or the item 22 with the RFID tag 24 in multiple predetermined positions (x, y) and by reading response waves by the wireless tag reading apparatus 10. The training data TD may be collected by the wireless tag reading apparatus 10 or may be obtained from the outside.

The training data TD for the tag position estimation models Mi is collected for respective tag attributes and item attributes, and the tag position estimation models Mi are trained for respective tag attributes and item attributes to determine parameters. In FIG. 8, it is assumed that training data TDA and training TDB are different from each other in terms of at least one of a tag attribute and an item attribute.

For example, parameters of the tag position estimation models Mi are determined for respective inlay types of RFID tags 24. As another example, parameters of the tag position estimation models Mi are determined for respective tag groups (tag types) of RFID tags 24, each tag group being formed of one or more inlay types having substantially the same influence on the reading performance. As another example, parameters of the tag position estimation models Mi are determined for items 22 containing metal and items 22 not containing metal. As another example, parameters of the tag position estimation models Mi are determined for respective classifications based on levels of influence, on the reading, of items 22 containing metal. As another example, parameters of the tag position estimation models Mi are determined for respective classifications based on dielectric constants of items 22.

Parameters of the tag position estimation models Mi are not necessarily determined for respective tag attributes and item attributes. Parameters of the tag position estimation models Mi may be determined for respective combinations of tag attributes and item attributes. For example, parameters of the tag position estimation models Mi may be determined for respective combinations of inlay types and classifications based on levels of influence, on the reading, of items 22 containing metal.

The number of classifications based on the levels of influence, on the reading, of items 22 containing metal and the number of classifications based on dielectric constants of items 22 may be determined freely.

The determined parameters are stored in the storage unit 36 as the tag position estimation models Mi. The tag attribute and/or the item attribute corresponding to each tag position estimation model Mi is stored, for example, as header information of the tag position estimation model Mi.

(Inference Using Tag Position Estimation Model)

The tag position determination unit 54 inputs the RSSI value De and the phase value Df of the read data D read from the RFID tag 24 to a tag position estimation model Mi, and acquires information (tag position) regarding the position of the RFID tag 24 output from the tag position estimation model Mi in response to the input of the RSSI value De and the phase value Df.

Note that the tag position estimation model Mi is configured to be able to output a reliability level of an inference result of the tag position. For example, the output layer of the tag position estimation model Mi includes a node that outputs a value (i.e., a reliability level) from 0 to 1 indicating the reliability level of the tag position.

The tag position determination unit 54 determines that the RFID tag 24 is in the basket 13 when the tag position of the RFID tag 24 output from the tag position estimation model Mi is inside of the position marker 16, that is, within a region in which the basket 13 is placed. The tag position determination unit 54 determines that the RFID tag 24 is in the basket 13 when the reliability level of the inference is greater than or equal to a predetermined threshold value.

Data input to the tag position estimation model Mi is not limited to numerical information indicating the time series of the RSSI value De and the phase value Df, but may also be image information such as a graph indicating the time series of the RSSI value De and the phase value Df.

(Preprocessing and Model Designation)

While in operation, as illustrated in FIG. 8, the adjustment unit 55 selects a tag position estimation model Mi based on at least one of the tag attribute information Dc and the item attribute information Dd in the read data D (model designation). Further, the adjustment unit 55 performs preprocessing for correcting the RSSI value De based on at least one of the tag attribute information Dc and the item attribute information Dd in the read data D.

Figure 9A:
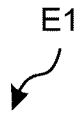
FIG. 9A is a diagram for explaining an example of setting an offset corresponding to an inlay type in preprocessing according to an embodiment.

FIG. 9A is a diagram for explaining an example of setting an offset value corresponding to an inlay type in the preprocessing according to the embodiment. FIG. 9A is an example in which predetermined four bits of the read-data D indicate an inlay type. It is assumed that data E1, which indicates the relationship between inlay types and offset values as shown in FIG. 9A, is predetermined and stored in the storage unit 36. For example, the adjustment unit 55 corrects the RSSI value De in the read data D by using an offset value corresponding to the inlay type. For example, the offset value increases as the influence of the inlay type on the reading result increases. In the example of FIG. 9A, the adjustment unit 55 does not correct the RSSI value De in the read data D when the inlay type in the read data D is an inlay A indicated by a bit position "0000". When the inlay type in the read data D is an inlay B indicated by a bit position "0001", an inlay C indicated by a bit position "0010", or an inlay D indicated by a bit position "0011", the adjustment unit 55 corrects the RSSI value De in the read data D with the corresponding offset value "+2", "+1", or "+2" dB.

Figure 9B:
FIG. 9B is a diagram for explaining an example of setting an offset corresponding to a tag group in preprocessing according to an embodiment.

The offset values are not necessarily associated with inlay types. For example, the offset values may be associated with tag groups (tag types) of RFID tags 24 each of which is formed by one or more inlay types having similar levels of influence on the reading result. FIG. 9B is a diagram for explaining an example of setting an offset value corresponding to a tag group in the preprocessing according to an embodiment. In FIG. 9B, the 95th and 96th bits of the read data D indicate a tag group. It is assumed that data E2, which indicates the relationship between tag groups and offset values as shown in FIG. 9B, is stored in the storage unit 36 in advance. For example, the adjustment unit 55 corrects the RSSI value De in the read data D with an offset value corresponding to the tag group. For example, the offset value increases as the influence of the tag group on the reading result increases. In FIG. 9B, when the 95th and 96th bits of the read data D are "00" indicating a tag group 0, the adjustment unit 55 does not correct the RSSI value De in the read data D. When the 95th and 96th bits of the read data D are "01" indicating a tag group 1, "10" indicating a tag group 2, or "11" indicating a tag group 3, the adjustment unit 55 corrects the RSSI value De in the read data D with the corresponding offset value "+3", "+6", or "+9" dB.

Figure 9C:
FIG. 9C is a diagram for explaining an example of selecting a tag position estimation model corresponding to a tag group in tag position estimation according to an embodiment.

FIG. 9C is a diagram for explaining an example of selecting a tag position estimation model Mi corresponding to a tag group in the tag position estimation according to an embodiment. In FIG. 9C, the 95th and 96th bits of the read data D indicate a tag group. It is assumed that data F1, which indicates the relationship between tag groups and tag position estimation models Mi as shown in FIG. 9C, is predetermined and stored in the storage unit 36. For example, the adjustment unit 55 selects a tag position estimation model Mi corresponding to a tag group, and notifies the selected tag position estimation model Mi to the tag position determination unit 54. It is assumed that parameters of the tag position estimation models Mi are determined at least for respective tag groups. In the example of FIG. 9C, when the 95th and 96th bits of the read data D are "00" indicating a tag group 0, "01" indicating a tag group 1, "10" indicating a tag group 2, or "11" indicating a tag group 3, the adjustment unit 55 selects the corresponding tag group model 0, 1, 2, or 3 as the tag position estimation model Mi. Note that the tag position estimation model Mi is not necessarily selected based on the tag group, and may be selected based on the inlay type.

Figure 9D:
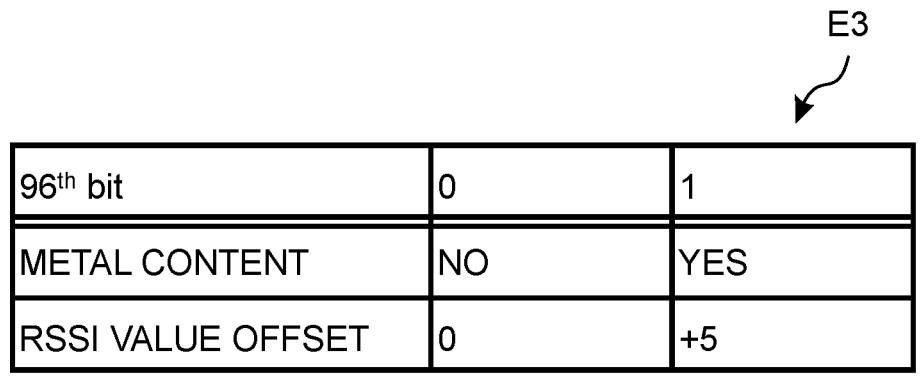
FIG. 9D is a diagram for explaining an example of setting an offset corresponding to metal influence in preprocessing according to an embodiment.
Figure 9E:
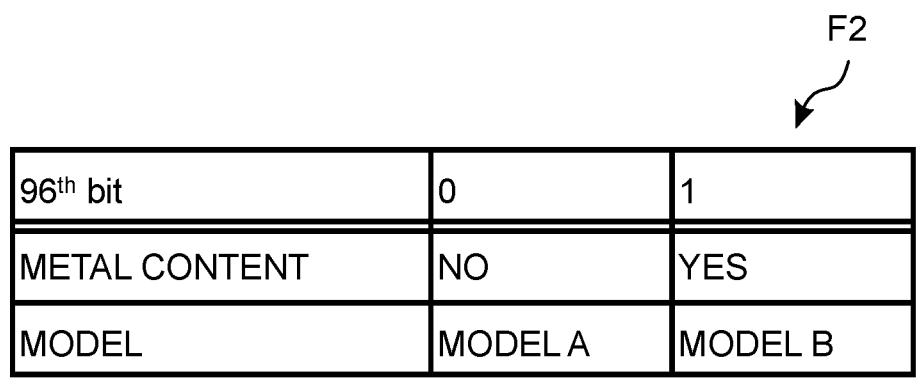
FIG. 9E is a diagram for explaining an example of selecting a tag position estimation model corresponding to metal influence in tag position estimation according to an embodiment.

Here, whether to perform the offset operation, the offset value, and the tag position estimation model Mi may be determined based on whether an item contains metal. FIG. 9D is a diagram for explaining an example of setting an offset value based on metal influence in the preprocessing according to an embodiment. FIG. 9E is a diagram for explaining an example of selecting a tag position estimation model Mi based on metal influence in the tag position estimation according to an embodiment. In FIGS. 9D and 9E, the 96th bit of the read data D indicates the presence or absence of metal content. It is assumed that data E3, which indicates the relationship between the presence or absence of metal content and offset values as shown in FIG. 9D, is predetermined and stored in the storage unit 36. Further, it is assumed that data F2, which indicates the relationship between the presence or absence of metal content and tag position estimation models Mi as shown in FIG. 9E, is predetermined and stored in the storage unit 36. For example, the adjustment unit 55 corrects the RSSI value De in the read data D with an offset value corresponding to the presence or absence of metal content. For example, the offset value used when metal content is present is greater than the offset value used when metal content is not present. In the example of FIG. 9D, the adjustment unit 55 does not correct the RSSI value De in the read data D when the 96th bit of the read data D is "0" and indicates that metal content is not present. Also, when the 96th bit of the read data D is "1" and indicates that metal content is present, the adjustment unit 55 corrects the RSSI value De in the read data D with an offset value of "+5" dB. For example, the adjustment unit 55 selects a tag position estimation model Mi based on the presence or absence of metal content, and notifies the selected tag position estimation model Mi to the tag position determination unit 54. It is assumed that the parameters of the tag position estimation models Mi are determined for at least each of a case where metal content is present and a case where metal content is not present. In the example shown in FIG. 9E, the adjustment unit 55 selects a model A as the tag position estimation model Mi when the 96th bit of the read data D is "0" and indicates that metal content is not present, and selects a model B as the tag position estimation model Mi when the 96th bit of the read data D is "1" and indicates that metal content is present. Note that whether to perform the offset operation, the offset value, and the tag position estimation model Mi may be determined in accordance with the classifications based on the amounts of metal content, the classifications based on dielectric constants, and the classifications based on the levels of influence on the reading result that are associated with the amounts of metal content and/or dielectric constants. For example, the offset value increases as the amount of metal content or the dielectric constant increases.

(Processes Performed by Wireless Reading Apparatus)

Figure 10:
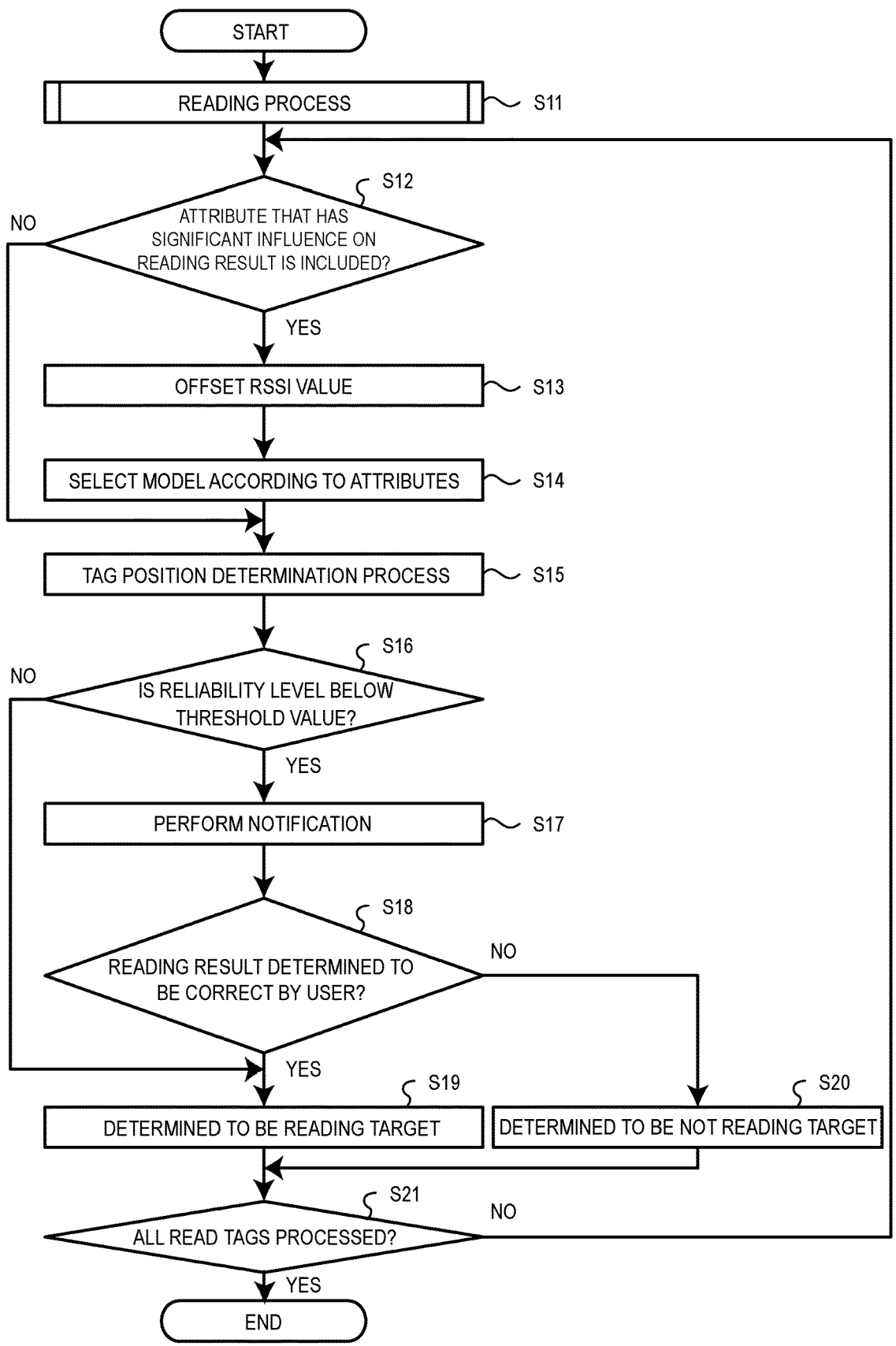
FIG. 10 is a flowchart illustrating a process performed by the wireless tag reading apparatus.
Figure 11:
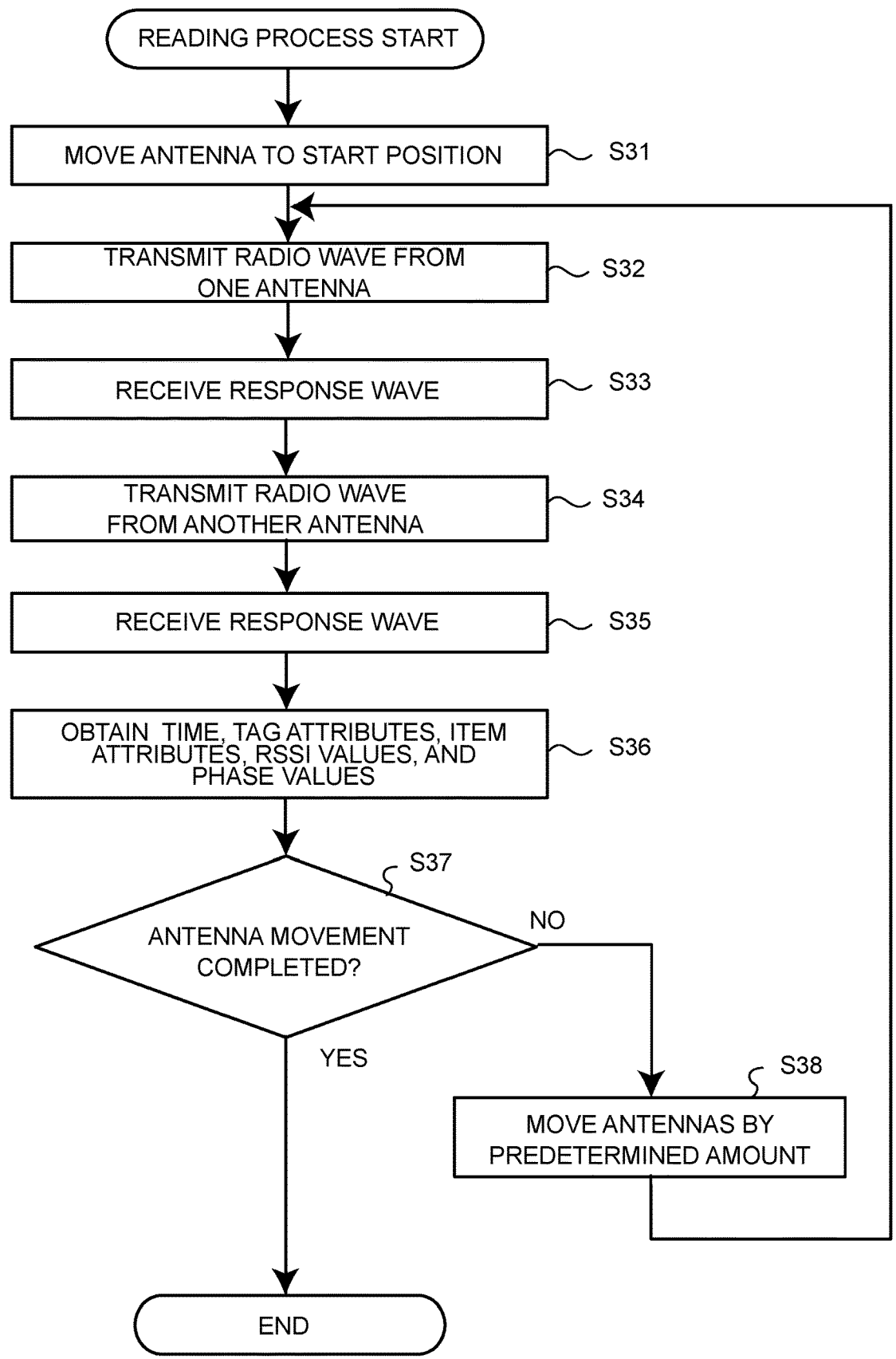
FIG. 11 is a flowchart illustrating a reading process in FIG. 10.

Processes performed by the wireless tag reading apparatus 10 will be described with reference to FIG. 10 and FIG. 11. FIG. 10 is a flowchart illustrating a process performed by the wireless tag reading apparatus 10 of FIG. 1. FIG. 11 is a flowchart illustrating a reading process illustrated in FIG. 10.

The tag information acquisition unit 53 performs a reading process of the RFID tag 24 (step S11). In the reading process, the drive control unit 52 moves the antennas 14 and 15 to a start position (step S31). Thereafter, the transmission/reception unit 51 transmits a radio wave from one of the antennas (e.g., the antenna 14) (step S32), and receives a response wave (step S33). Also, the transmission/reception unit 51 transmits a radio wave (step S34) from another one of the antennas (e.g., the antenna 15) and receives a response wave (step S35). The tag information acquisition unit 53 acquires the time at which each of the response waves is received, the tag attribute information Dc and the item attribute information Dd included in the response waves, and the RSSI values De and the phase values Df of the response waves (step S36). The drive control unit 52 determines whether the movement of the antennas 14 and 15 has been completed (step S37). When it is determined that the movement of the antennas 14 and 15 has not been completed (step S37: No), the drive control unit 52 moves the antennas 14 and 15 by a predetermined amount (step S38), and repeats the process of steps S32 to S38 until it is determined at step S37 that the movement of the antennas 14 and 15 has been completed. On the other hand, when it is determined that the movement of the antennas 14 and 15 has been completed (step S37: Yes), the process of FIG. 11 ends, and the process proceeds to step S12 of FIG. 10.

Based on at least one of the tag attribute information Dc and the item attribute information Dd in the read data D (tag information), the adjustment unit 55 determines whether the read data D (tag information) includes an attribute having a significant influence on the reading result (step S12).

When an attribute having a significant influence on the reading result is included (step S12: Yes), the adjustment unit 55 corrects the RSSI value De with an offset value corresponding to at least one of the tag attribute information Dc and the item attribute information Dd (step S13). Further, the adjustment unit 55 selects a tag position estimation model Mi corresponding to at least one of the tag attribute information Dc and the item attribute information Dd (step S14).

When the reading result does not include any attribute having a significant influence (step S12: No), or after step S14, the tag position determination unit 54 performs a tag position determination process of determining the position of the RFID tag 24 as described above with reference to FIG. 8 and the like (step S15).

After the tag position determination process, the notification unit 56 determines whether the reliability level of the inference is less than a predetermined threshold value (step S16). When the reliability level of the inference is less than the predetermined threshold value (step S16: Yes), the notification unit 56 notifies the user that there is a possibility that the reading result is incorrect by using, for example, the display device 40 (step S17). Note that the threshold value used in the determination at step S16 is smaller than the threshold value used by the tag position determination unit 54 to determine that RFID tag 24 is in the basket 13.

Figure 12:
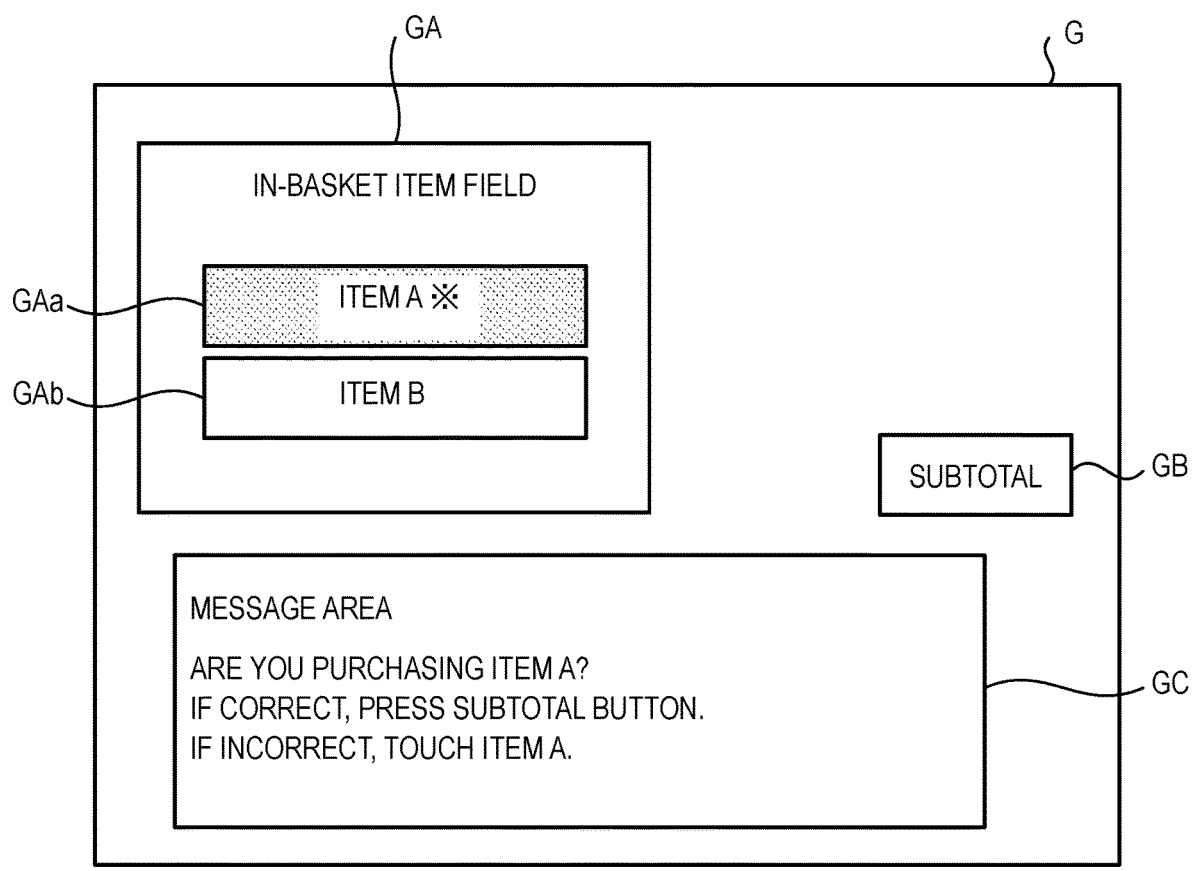
FIG. 12 is a diagram illustrating an example of a notification according to an embodiment.

FIG. 12 is a diagram illustrating an example of notification according to an embodiment. For example, the notification unit 56 displays a display screen G on the display device 40. The display screen G includes an in-basket item field GA displaying items 22 determined to be located in the basket 13, a subtotal button GB, and a message area GC. In FIG. 12, the in-basket item field GA includes a display field GAa displaying an item A and a display field GAb displaying an item B. For example, when it is determined at step S16 that the reliability level of the item A is less than the predetermined threshold value, the notification unit 56 highlights the display field GAa displaying the item A (indicated by hatching in the example of FIG. 12). Also, the notification unit 56 displays, in the message area GC, a message such as "Are you purchasing item A? If correct, press subtotal button. If incorrect, touch item A."

Note that the notification unit 56 may determine whether to perform notification based not only on the reliability level but also on the item attribute information Dd. As an example, the notification unit 56 performs notification for an item 22 containing metal, and does not perform notification for an item 22 not containing metal. As an example, the notification unit 56 performs notification for an item 22 when the item 22 belongs to a predetermined classification that is based on the level of influence on the reading result, which varies depending on the amount of metal content and/or the magnitude of the dielectric constant.

Note that notification is not necessarily performed by displaying a message on the display device 40. For example, notification may be performed by outputting display information to a display of an external device, such as a POS terminal, outside of the wireless tag reading apparatus 10, or may be performed by a method other than displaying a message, e.g., by turning a dedicated lamp on or off or outputting a sound.

After performing the notification, the tag position determination unit 54 determines whether the reading result is correct based on confirmation by the user (step S18). For example, the tag position determination unit 54 determines that the reading result is not correct when a user operation denying the reading result, such as selecting an item 22 highlighted in the in-basket item field GA by tapping the display field GAa, is received by the operating device 41. The tag position determination unit 54 determines that the reading result is correct when a user operation, such as tapping the subtotal button GB, that affirms the reading result is received by the operating device 41.

When it is determined that the reading result is correct based on confirmation by the user (step S18: Yes) or when the reliability level of the inference result is greater than or equal to a predetermined threshold value (step S16: No), the tag position determination unit 54 determines that the item 22 is a reading target (step S19). On the other hand, when it is determined that the reading result is not correct (step S18: No), the tag position determination unit 54 determines that the item 22 is not a reading target (step S20). In this case, for example, the user manually performs item registration by scanning a barcode attached to the corresponding item 22.

Thereafter, the tag information acquisition unit 53 determines whether response waves from all read RFID tags 24 have been processed (step S21). When it is not determined that the response waves from all read RFID tags 24 have been processed (step S21: No), steps S12 to S21 of FIG. 10 are repeated until it is determined at step S21 that the response waves from all read RFID tags 24 have been processed. On the other hand, when it is determined that the response waves from all read RFID tags 24 have been processed (S24: Yes), the process of FIG. 10 ends. Here, the confirmed reading result is transmitted to an external device such as a POS terminal or a higher-level server (not shown), and checkout process or payment process of the item 22 is performed.

Note that steps S16 to S18 in FIG. 10 may be omitted. That is, whether an item 22 is a reading target may be determined based on the result of the determination process at step S15.

Although the inlay type and the tag group are used as tag attributes (tag types) in the above-described embodiment, only one of the inlay type and the tag group may be used as the tag type. Further, the item attribute may be any one of the presence or absence of metal content, the level of influence of metal content, and the magnitude of the dielectric constant. In addition, in the preprocessing or the model selection, only one of the tag attribute and the item attribute may be used.

In the above-described embodiment, it is assumed that the tag attribute information and the item attribute information are included in an item code for identifying the item 22. However, the present invention is not limited to this example. The item code for identifying the item 22 may be configured to not include the tag attribute information and the item attribute information. In this case, for example, data indicating the correspondence between item codes for identifying items 22 and tag attribute information and/or item attribute information may be prepared and stored in the storage unit 36.

Effects of Embodiment

In a shieldless checkout, a tag is read by moving an antenna, and whether the tag is a reading target is determined based on RSSI and phase data obtained by reading. In order to improve the accuracy of the determination, a machine learning model may be used for the determination. However, since various types of RFID tags including various RFID tag chips and RFID tag antennas (inlays) are in the marketplace, it is difficult to generate a learning model trained for all types of RFID tags. Further, even if it is possible to train a learning model, the learning model becomes complicated, and it is difficult to increase the determination accuracy.

As described above, the wireless tag reading apparatus 10 according to the present embodiment includes the antennas 14 and 15, the drive control unit 52, the tag information acquisition unit 53, the tag position determination unit 54, and the adjustment unit 55. The antennas 14 and 15 are configured to receive radio waves from the RFID tags 24. The drive control unit 52 moves the antennas 14 and 15 to multiple positions. Based on radio waves received from RFID tags 24 by the antennas 14 and 15 at multiple positions, the tag information acquisition unit 53 acquires tag information (tag attribute information and item attribute information, or item codes associated with tag attribute information and item attribute information) stored in the RFID tags 24 and radio wave information (RSSI values and phase values) related to the received radio waves. The tag position determination unit 54 performs a determination process of determining whether each RFID tag 24 is a reading target based on information on the position of the RFID tag 24 that is output from a tag position estimation model Mi in response to an input of radio wave information related to radio waves received by the antennas 14 and 15. Parameters of the tag position estimation model Mi are determined such that the information on the position of the RFID tag 24 is output in response to an input of the radio wave information. The adjustment unit 55 adjusts the determination process based on the tag information.

The control program P according to an embodiment causes a computer (e.g., the control part 31) of the wireless tag reading apparatus 10, which includes the antennas 14 and 15 configured to receive radio waves from the RFID tags 24 and the drive control unit 52 that moves the antennas 14 and 15 to multiple positions, to acquire, based on radio waves received from RFID tags 24 by the antennas 14 and 15 at multiple positions, tag information (tag attribute information and item attribute information, or item codes associated with tag attribute information and item attribute information) stored in the RFID tags 24 and radio wave information (RSSI values and phase values) related to the received radio waves; to perform a determination process of determining whether each RFID tag 24 is a reading target based on information on the position of the RFID tag 24 that is output from a tag position estimation model Mi in response to an input of radio wave information related to radio waves received by the antennas 14 and 15, parameters of the tag position estimation model Mi being determined such that the information on the position of the RFID tag 24 is output in response to an input of the radio wave information; and to adjust the determination process based on the tag information.

This configuration makes it possible to adjust the determination process in which whether the RFID tag 24 is a reading target is determined based on the tag information, and thereby makes it possible to improve the accuracy of the determination of the position of the RFID tag 24.

In the wireless tag reading apparatus 10 according to the embodiment, the adjustment unit 55 corrects the RSSI value included in the radio wave information by using an offset value corresponding to the tag information. In addition, the tag position determination unit 54 inputs the radio wave information including the corrected RSSI value to the tag position estimation model Mi. This configuration makes it possible to compensate for a reduction in the RSSI value caused by the RFID tag 24 or the item 22 to which the RFID tag 24 is attached and thereby makes it possible to reduce the influence, on the reading, of the RFID tag 24 or the item 22 to which the RFID tag 24 is attached.

Further, in the wireless tag reading apparatus 10 according to the embodiment, the adjustment unit 55 selects a tag position estimation model Mi based on the tag information. In addition, the tag position determination unit 54 performs a determination process using the tag position estimation model Mi selected based on the tag information. This configuration makes it possible to perform the determination process using a tag position estimation model Mi that is trained for RFID tags 24 or items 22 with the RFID tags 24 that have similar tag attributes and/or similar item attributes, that is, RFID tags 24 or items 22 with the RFID tags 24 that have similar levels of influence on the reading, and thereby makes it possible to improve the accuracy of inference performed using the tag position estimation model Mi.

Further, in the wireless tag reading apparatus 10 according to the embodiment, the adjustment unit 55 corrects the RSSI value using an offset value corresponding to the tag information, and selects a tag position estimation model Mi corresponding to the tag information. This configuration makes it possible to improve the accuracy of inference performed using the tag position estimation model Mi while reducing the influence, on the reading, of the RFID tag 24 or the item 22 to which the RFID tag 24 is attached.

Further, in the wireless tag reading apparatus 10 according to the embodiment, the adjustment unit 55 adjusts the determination process based on at least one of the tag attribute information Dc included in the tag information and indicating the type of the RFID tag 24, the tag attribute information associated with the item code, the item attribute information Dd included in the tag information and indicating the type of the item 22 to which the RFID tag 24 is attached, and the item attribute information associated with the item code. This configuration makes it possible to appropriately adjust the determination process in which whether the RFID tag 24 is a reading target is determined based on the tag information.

Conventionally, in a shieldless checkout, a tag is read by moving an antenna, and whether the RFID tag 24 is a reading target is determined based on the RSSI and phase data obtained by reading. In order to improve the accuracy of the determination, a machine learning model may be used for the determination. However, even in the determination using the machine learning model, there is a limit in accuracy, and there is a demand for avoiding erroneous determination particularly for checkout purposes.

As described above, the wireless tag reading apparatus 10 according to the present embodiment includes the antennas 14 and 15, the drive control unit 52, the tag information acquisition unit 53, the tag position determination unit 54, and the notification unit 56. The antennas 14 and 15 are configured to receive radio waves from RFID tags 24. The drive control unit 52 moves the antennas 14 and 15 to multiple positions. Based on radio waves received from RFID tags 24 by the antennas 14 and 15 at multiple positions, the tag information acquisition unit 53 acquires tag information (tag attribute information and item attribute information, or item codes associated with tag attribute information and item attribute information) stored in the RFID tags 24 and radio wave information (RSSI values and phase values) related to the received radio waves. The tag position determination unit 54 performs a determination process of determining whether each RFID tag 24 is a reading target based on information on the position of the RFID tag 24 that is output from a tag position estimation model Mi in response to an input of radio wave information related to radio waves received by the antennas 14 and 15. Parameters of the tag position estimation model Mi are determined such that the information on the position of the RFID tag 24 is output in response to an input of the radio wave information. The notification unit 56 notifies the user when information included in and indicating the reliability level of the information on the position of the RFID tag 24 output from the tag position estimation model Mi is less than a predetermined threshold.

The control program P according to an embodiment causes a computer (e.g., the control part 31) of the wireless tag reading apparatus 10, which includes the antennas 14 and 15 configured to receive radio waves from the RFID tags 24 and the drive control unit 52 that moves the antennas 14 and 15 to multiple positions, to acquire, based on radio waves received from RFID tags 24 by the antennas 14 and 15 at multiple positions, tag information (tag attribute information and item attribute information, or item codes associated with tag attribute information and item attribute information) stored in the RFID tags 24 and radio wave information (RSSI values and phase values) related to the received radio waves; to perform a determination process of determining whether each RFID tag 24 is a reading target based on information on the position of the RFID tag 24 output from the tag position estimation model Mi in response to an input of the radio wave information related to radio waves received by the antennas 14 and 15, parameters of the tag position estimation model Mi being determined such that the information on the position of the RFID tag 24 is output in response to an input of radio wave information; and to notify the user when information included in and indicating the reliability level of the information on the position of the RFID tag 24 output from the tag position estimation model Mi is less than a predetermined threshold value.

This configuration makes it possible to prompt the user to confirm the inference result and thereby makes it possible to improve the accuracy of determination of the position of the RFID tag 24 and suppress erroneous determination.

The wireless tag reading apparatus 10 according to the embodiment further includes the operating device 41 that receives an operation performed by the user to input a confirmation result. In the wireless tag reading apparatus 10 according to the embodiment, the tag position determination unit 54 determines whether the RFID tag 24 is a reading target based on the operation performed by the user to input a confirmation result. This configuration enables the user to perform confirmation when the reliability level of the inference result is low and thereby makes it possible to improve the accuracy of determination of the position of the RFID tag 24 and suppress erroneous determination.

Further, in the wireless tag reading apparatus 10 according to the embodiment, the notification unit 56 can notify the user based also on the item attribute information Dd included in the tag information and indicating the type of the item 22 to which the RFID tag 24 is attached or the item attribute information associated with the item code. With this configuration, even when the determination accuracy is reduced due to the radio wave environment or the like, it is possible to prompt the user to confirm the inference result or to enable the user to perform confirmation.

The wireless tag reading apparatus 10 according to the embodiment further includes the adjustment unit 55 that corrects the RSSI value included in the radio wave information by using an offset value corresponding to the tag information. In addition, the tag position determination unit 54 inputs the radio wave information including the corrected RSSI value to the tag position estimation model Mi. This configuration makes it possible to compensate for a reduction in the RSSI value caused by the RFID tag 24 or the item 22 to which the RFID tag 24 is attached and thereby makes it possible to reduce the influence, on the reading result, of the RFID tag 24 or the item 22 to which the RFID tag 24 is attached.

The wireless tag reading apparatus 10 according to the embodiment further includes the adjustment unit 55 that selects a tag position estimation model Mi based on the tag information. In addition, the tag position determination unit 54 performs a determination process using the tag position estimation model Mi that is selected based on the tag information. According to this configuration, since the determination process can be performed using a tag position estimation model Mi trained for RFID tags 24 or items 24 with the RFID tags 22 that have similar levels of influence on the reading result, the accuracy of inference performed by using the tag position estimation model Mi is improved.

According to at least one of the embodiments described above, it is possible to improve the accuracy of determination of the position of a wireless tag.

Note that "determining whether something is A" in the present embodiment can be achieved by at least one of "determining that something is A" and "determining that something is not A".

Control programs executed by the wireless tag reading apparatus 10 of the present embodiment may be installed in advance in a storage medium such as a ROM.

Control programs executed by the wireless tag reading apparatus 10 of the present embodiment may also be provided as installable or executable programs that are stored in a computer-readable recording medium such as a CD-ROM, a flexible disk (FD), a CD-R, or a Digital Versatile Disk (DVD).

Further, control programs executed by the wireless tag reading apparatus 10 of the present embodiment may be stored in a computer connected to a network such as the Internet and may be downloaded via the network. Further, control programs executed by the wireless tag reading apparatus 10 of the present embodiment may be provided or distributed via a network such as the Internet.

A control program executed by the wireless tag reading apparatus 10 of the present embodiment may have a module configuration including the above-described functional units, such as the transmission/reception unit 51, the drive control unit 52, the tag information acquisition unit 53, the tag position determination unit 54, the adjustment unit 55, and the notification unit 56. The CPU 32 reads the control program from the storage medium and loads the functional units into a main storage device such as a RAM. As a result, the above-described functional units are generated on the main storage device.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading apparatus comprising:
an antenna;
a driving mechanism configured to move the antenna to multiple positions; and
a controller configured to:
upon receipt of a radio wave from a wireless tag via the antenna at each of the multiple positions, obtain tag information stored in the wireless tag and radio wave information related to the radio wave,
adjust the radio wave information based on the tag information, and
determine whether the wireless tag is a reading target based on information indicating a position of the wireless tag that is output from a model in response to an input of the adjusted radio wave information.

2. The wireless tag reading apparatus according to claim 1, wherein the controller is configured to:
correct a received signal strength indicator included in the radio wave information based on an offset value corresponding to the tag information, and
input the radio wave information including the corrected received signal strength indicator to the model.

3. The wireless tag reading apparatus according to claim 1, wherein the controller is configured to:
select the model corresponding to the tag information, and
determine whether the wireless tag is a reading target using the selected model.

4. The wireless tag reading apparatus according to claim 1, wherein the controller is configured to:
correct a received signal strength indicator included in the radio wave information based on an offset value corresponding to the tag information,
select the model corresponding to the tag information, and
input the radio wave information including the corrected received signal strength indicator to the selected model.

5. The wireless tag reading apparatus according to claim 1, wherein the controller adjusts the radio wave information based on at least one of:
tag attribute information indicating a type of the wireless tag and included in or associated with the tag information and
object attribute information indicating a type of an object to which the wireless tag is attached and included in or associated with the tag information.

6. The wireless tag reading apparatus according to claim 1, wherein the controller is configured to input, to the model, the radio wave information including a received signal strength indicator and a phase value of the radio wave.

7. The wireless tag reading apparatus according to claim 6, wherein
the antenna transmits a transmission wave to the wireless tag and receives the radio wave from the wireless tag as a response to the transmission wave, and
the phase value indicates a phase difference between the transmission wave and the radio wave.

8. The wireless tag reading apparatus according to claim 6, wherein
the antenna receives radio waves at predetermined time intervals from the wireless tag while being moved, and
the controller is configured to input, to the model, the radio wave information including time series data of the received signal strength indicator of the radio waves and time series data of the phase value of the radio waves.

9. The wireless tag reading apparatus according to claim 1, further comprising:
a storage device that stores multiple models, parameters of the models being determined at least for respective types of wireless tags or respective types of objects to which the wireless tags are to be attached, wherein
the tag information includes or is associated with tag attribute information indicating a type of the wireless tag and object attribute information indicating a type of an object to which the wireless tag is attached, and
the controller is configured to select one of the multiple models based on at least one of the tag attribute information and the object attribute information.

10. The wireless tag reading apparatus according to claim 9, wherein
the tag attribute information includes at least an inlay type of the wireless tag; and
the object attribute information includes at least one of:
metal-containing information indicating whether the object contains a metal,
metal influence information indicating that the object contains a metal and particularly influences reading performance of the wireless tag reading apparatus, and
dielectric constant information indicating whether the object has a high dielectric constant.

11. A non-transitory computer readable storage medium storing a program that causes a computer to execute a method comprising:
moving an antenna to multiple positions, and upon receipt of a radio wave from a wireless tag via the antenna at each of multiple positions, obtaining tag information stored in the wireless tag and radio wave information related to the radio wave;
adjusting the radio wave information based on the tag information; and
determining whether the wireless tag is a reading target based on information indicating a position of the wireless tag that is output from a model in response to an input of the adjusted radio wave information.

12. The non-transitory computer readable storage medium according to claim 11, wherein the method further comprises:
correcting a received signal strength indicator included in the radio wave information based on an offset value corresponding to the tag information; and
inputting the radio wave information including the corrected received signal strength indicator to the model.

13. The non-transitory computer readable storage medium according to claim 11, wherein the method further comprises:
selecting the model corresponding to the tag information, wherein
the selected model is used to determine whether the wireless tag is a reading target.

14. The non-transitory computer readable storage medium according to claim 11, wherein the method further comprises:
correcting a received signal strength indicator included in the radio wave information based on an offset value corresponding to the tag information;
selecting the model corresponding to the tag information; and inputting the radio wave information including the corrected received signal strength indicator to the selected model.

15. The non-transitory computer readable storage medium according to claim 11, wherein the radio wave information is adjusted based on at least one of:
tag attribute information indicating a type of the wireless tag and included in or associated with the tag information, and
object attribute information indicating a type of an object to which the wireless tag is attached and included in or associated with the tag information.

16. The non-transitory computer readable storage medium according to claim 11, wherein the method further comprises:
inputting, to the model, the radio wave information including a received signal strength indicator and a phase value of the radio wave.

17. The non-transitory computer readable storage medium according to claim 16, wherein
the method further comprises:
causing the antenna to transmit a transmission wave to the wireless tag and receive the radio wave from the wireless tag as a response to the transmission wave, and
the phase value indicates a phase difference between the transmission wave and the radio wave.

18. The non-transitory computer readable storage medium according to claim 16, wherein
the method further comprises:
causing the antenna to receive radio waves at predetermined time intervals from the wireless tag while the antenna is being moved; and
inputting, to the model, the radio wave information including time series data of the received signal strength indicator of the radio waves and time series data of the phase value of the radio waves.

19. The non-transitory computer readable storage medium according to claim 11, wherein
the method further comprises:
storing, in a storage device, multiple models, parameters of the multiple models being determined at least for respective types of wireless tags or respective types of objects to which the wireless tags are to be attached,
the tag information includes or is associated with tag attribute information indicating a type of the wireless tag and object attribute information indicating a type of an object to which the wireless tag is attached, and
the method further comprises:
selecting one of the multiple models based on at least one of the tag attribute information and the object attribute information.

20. A method performed by a wireless tag reading apparatus including an antenna and a driving mechanism configured to move the antenna to multiple positions, the method comprising:
moving an antenna to multiple positions by the driving mechanism, and upon receipt of a radio wave from a wireless tag via the antenna at each of multiple positions, obtaining tag information stored in the wireless tag and radio wave information related to the radio wave;
adjusting the radio wave information based on the tag information; and
determining whether the wireless tag is a reading target based on information indicating a position of the wireless tag that is output from a model in response to an input of the adjusted radio wave information.

* * * * *